（12）United States Patent
Cypher et al.

(10) Patent No.: US 7,549,025 B2
(45) Date of Patent: Jun. 16, 2009

(54) EFFICIENT MARKING OF SHARED CACHE LINES

(75) Inventors: Robert E. Cypher, Saratoga, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 394 days.

(21) Appl. No.: 11/635,270

(22) Filed: Dec. 6, 2006

(65) Prior Publication Data

US 2008/0140935 A1 Jun. 12, 2008

(51) Int. Cl.
    *G06F 12/08* (2006.01)
(52) U.S. Cl. ........................................ 711/141; 711/144
(58) Field of Classification Search ................. 711/141, 711/145, 144, 118
    See application file for complete search history.

(56) References Cited

U.S. PATENT DOCUMENTS

2004/0187123 A1* 9/2004 Tremblay et al. ........... 718/100

OTHER PUBLICATIONS

Anant Agrawal et al., "ATUM: A New Technique for Capturing Adress Traces Using Microcode", Proceedings of 13th Annual International Symposium on Computer Architecture, 1986, pp. 119-127.*
Publication: "*Token Coherence: A New Framework for Shared-Memory Multiprocessors*" by Milo M.K. Martin et al., IEEE Computer Society, Nov.-Dec. 2006, pp. 108-116.

* cited by examiner

*Primary Examiner*—Pierre-Michel Bataille
(74) *Attorney, Agent, or Firm*—Park, Vaughan & Fleming LLP; Anthony P. Jones

(57) ABSTRACT

One embodiment of the present invention provides a system that efficiently marks cache lines in a multi-processor computer system. The system starts by receiving a load request for a cache line from a requesting thread. Upon receiving the load request, the system loads a copy of the cache line into a local cache for the requesting thread. The system then load-marks the copy of the cache line in the local cache by incrementing a reader count value contained in metadata for the copy of the cache line, regardless of the cache coherency protocol status of the copy of the cache line, whereby the system updates the metadata in the local copy of the cache line without obtaining exclusive access to the cache line.

20 Claims, 8 Drawing Sheets

EFFICIENT MARKING OF SHARED CACHE LINES

BACKGROUND

1. Field of the Invention

The present invention relates to the design of computer systems. More specifically, the present invention relates to a technique that facilitates the efficient marking of shared cache lines in computer systems.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help to reduce the number of accesses to memory. However, when a memory operation, such as a load, generates a cache miss, the subsequent access to level-two (L2) cache or memory can require dozens or hundreds of clock cycles to complete, during which time the processor is typically idle, performing no useful work.

One way to mitigate this problem is to speculatively execute subsequent instructions (including loads) during cache misses. Specifically, the processor does not wait for loads that generate cache misses to complete, but instead speculatively performs subsequent loads. Consequently, a large number of loads can be speculatively performed out of program order. Eventually, the processor completes the earlier loads, and if the speculative execution is successful, commits the speculative loads to the architectural state of the processor.

Some existing speculative-execution techniques use dedicated hardware structures which maintain the addresses of speculative loads while snooping invalidations to detect if any of the speculatively-loaded cache lines is invalidated. These existing techniques "fail" a speculative load if such an invalidation is detected. Unfortunately, these existing techniques require dedicated hardware resources that do not scale well for a large number of speculative loads.

Another existing technique uses metadata in the L1 data cache to indicate if a thread has speculatively loaded the cache line. (See U.S. Pat. No. 7,089,374, entitled, "Selectively Unmarking Load-Marked Cache Lines during Transactional Program Execution," by inventors Marc Tremblay and Shailender Chaudhry.) This technique "fails" a speculative load if the corresponding speculatively-loaded cache line is invalidated or replaced from the L1 data cache. Unfortunately, because such invalidations and replacements occur more frequently than common coherence conflicts, they cause a significant number of failed speculative loads. These failed speculative loads consume a disproportionate amount of memory bandwidth and reduce the performance of non-speculative loads.

Hence, what is needed is a method and apparatus that facilitates reordering loads, such as speculative loads, without the above-described performance problems.

SUMMARY

One embodiment of the present invention provides a system that efficiently marks cache lines in a multi-processor computer system. The system starts by receiving a load request for a cache line from a requesting thread. Upon receiving the load request, the system loads a copy of the cache line into a local cache for the requesting thread. The system then load-marks the copy of the cache line in the local cache by incrementing a reader count value contained in metadata for the copy of the cache line, regardless of the valid cache coherency protocol status of the copy of the cache line, whereby the system updates the metadata in the local copy of the cache line without having to obtain exclusive access to the cache line.

In a variation of this embodiment, upon receiving a write request for a cache line, the system aggregates reader count values from copies of the cache line held by other threads to produce an aggregated reader count value. The system then provides the cache line and the aggregated reader count value to the requesting thread. The requesting thread then writes to the cache line only if the aggregated reader count value indicates that no other threads have load-marked the cache line.

In a variation of this embodiment, upon receiving a read request for a cache line that is in the modified state in a different processor's local cache, the system converts the cache line from the modified state to the shared state in the different processor's local cache. The system then delivers a copy of the cache line and metadata from the different processor's local cache to the local cache of the requesting thread.

In a variation of this embodiment, the system evicts a cache line from the local cache by: (1) writing back the cache line and the reader count value to the memory system if the cache line is in the modified state or (2) writing back the reader count value to the memory system if the cache line is in the exclusive state or the shared state.

In a variation of this embodiment, the cache coherency protocol is a MESI protocol or a MOESI protocol.

In a variation of this embodiment, the system load-marks a cache line by reading the reader count value from metadata in the cache line, incrementing the reader count value, and writing the incremented reader count value back to the cache line.

In a variation of this embodiment, if a cache line has already been load-marked in the local cache, the system can load the cache line without incrementing the reader count value.

In a variation of this embodiment, after the thread has finished loading from a cache line, the system removes the load-mark from the cache line by decrementing the reader count value in the metadata in the cache line, regardless of the valid cache coherency protocol status of the cache line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

One embodiment of the present invention provides a memory system which facilitates performing load operations out of program order. To accomplish this without violating a conventional memory model such as Sequential Consistency (SC) or Total-Store-Order (TSO), the present invention adds a load-mark to each cache line, wherein the load-mark can be propagated to all levels of the memory hierarchy, including all caches and main memory. When a cache line is load-marked by a thread, the load-mark prevents store operations by another thread to the cache line, thereby preventing another thread from overwriting the value in the cache line.

Note that a load-mark can be used in conjunction with a store-mark for a cache line. A detailed description of using a store-mark for a cache line can be found in the related application, entitled, "Facilitating Store Reordering through Cache line Marking" by the same inventors as the instant application, having Ser. No. 11/591,223, and filing date Oct. 31, 2006. This related application is incorporated by reference herein.

Computer System

Figure 1:
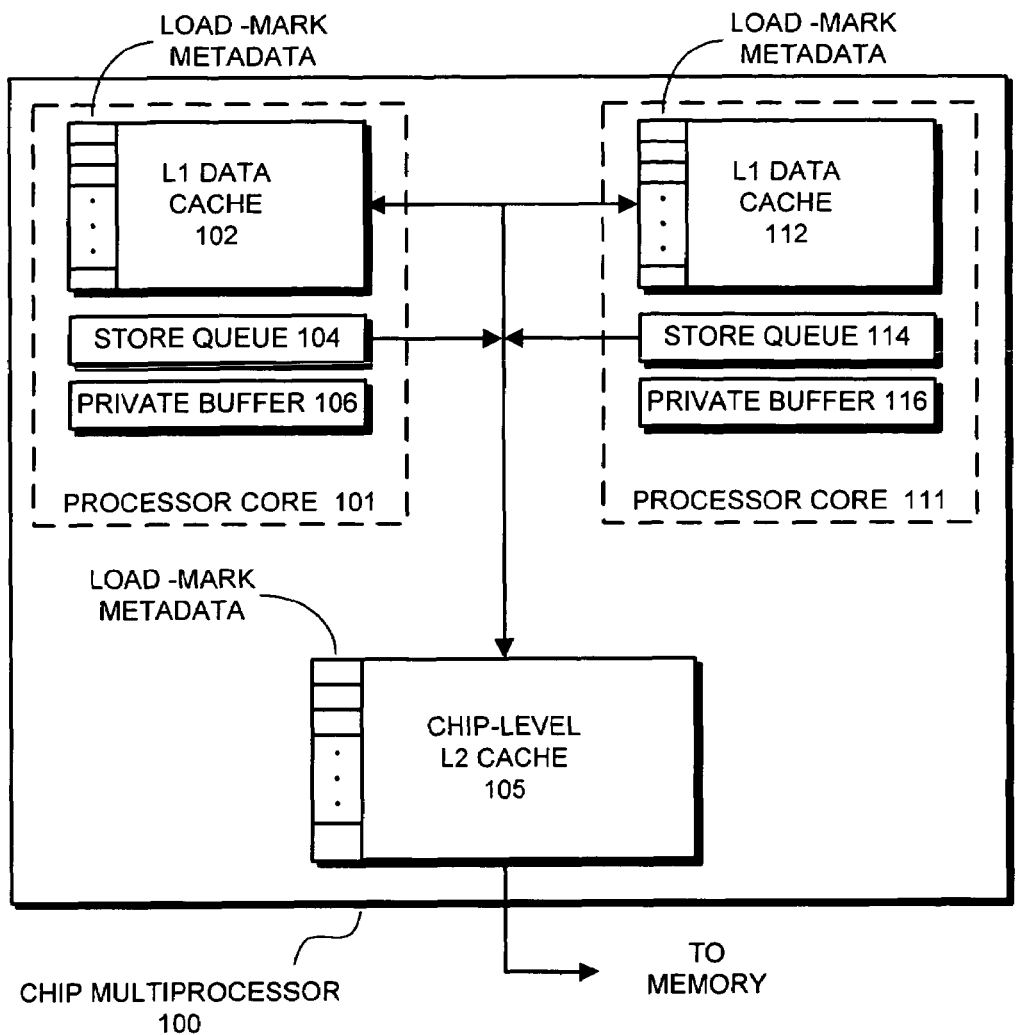
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes processor cores 101 and 111.

Processor cores 101 and 111 include L1 data caches 102 and 112 respectively, and they share chip-level L2 cache 105. Along with L1 data caches 102 and 112, processor cores 101 and 111 include store queues 104 and 114, which buffer pending store operations.

During a store operation, processor core 101 first performs a lookup for a corresponding cache line in L1 data cache 102. If the lookup generates a miss in L1 data cache 102, processor core 101 creates an entry for the store in store queue 104 and sends a corresponding fetch for the store to L2 cache 105.

During a subsequent load operation, processor core 101 uses a CAM structure to perform a lookup in store queue 104 to locate completed but not-yet-retired stores to the same address that are logically earlier in program order. If such a corresponding store exists, the load operation obtains its value from store queue 104 rather than from the memory subsystem.

Processor cores 101 and 111 additionally include private buffers 106 and 116, which maintain copies of addresses of load-marked cache lines to facilitate efficient lookups of theses addresses. When a thread needs to load from a cache line, that thread first checks its private buffer to determine if the thread has already load-marked the cache line.

In one embodiment of the present invention, this private buffer can be implemented as an SRAM-based CAM. (For a detailed description of an SRAM-based CAM, see U.S. patent application Ser. No. 11/495,852 entitled, "Content-Addressable Memory that Supports a Priority Ordering between Banks," by inventor Robert E. Cypher.) Furthermore, if load-marking of cache lines is performed in conjunction with the store-marking, the private buffer for load-marks can be the same private buffer that keeps track of the store-marks.

In addition, cache lines in L1 data caches 102 and 112, chip-level L2 cache 105, and in the memory (not shown) include load-mark metadata. During operation, the system places a load-mark on a cache line by writing a value to the cache line's load-mark metadata. We refer to the process of placing such a load-mark as "load-marking" the cache line. Load-marking is explained in more detail in the following sections of this disclosure.

The load-mark prevents any other thread from writing to the cache line but not from reading from the cache line, so multiple threads can place load-marks on a cache line (i.e., multiple threads can be reading from the cache line simultaneously). Hence, in one embodiment of the present invention, each cache line's metadata includes a "reader count" value that keeps track of how many threads have placed load-marks on the cache line. Note that when multiple threads have load-marked the cache line, other threads are prevented from writing to the cache line until the threads have removed their load-marks.

The Load Operation

Figure 2:
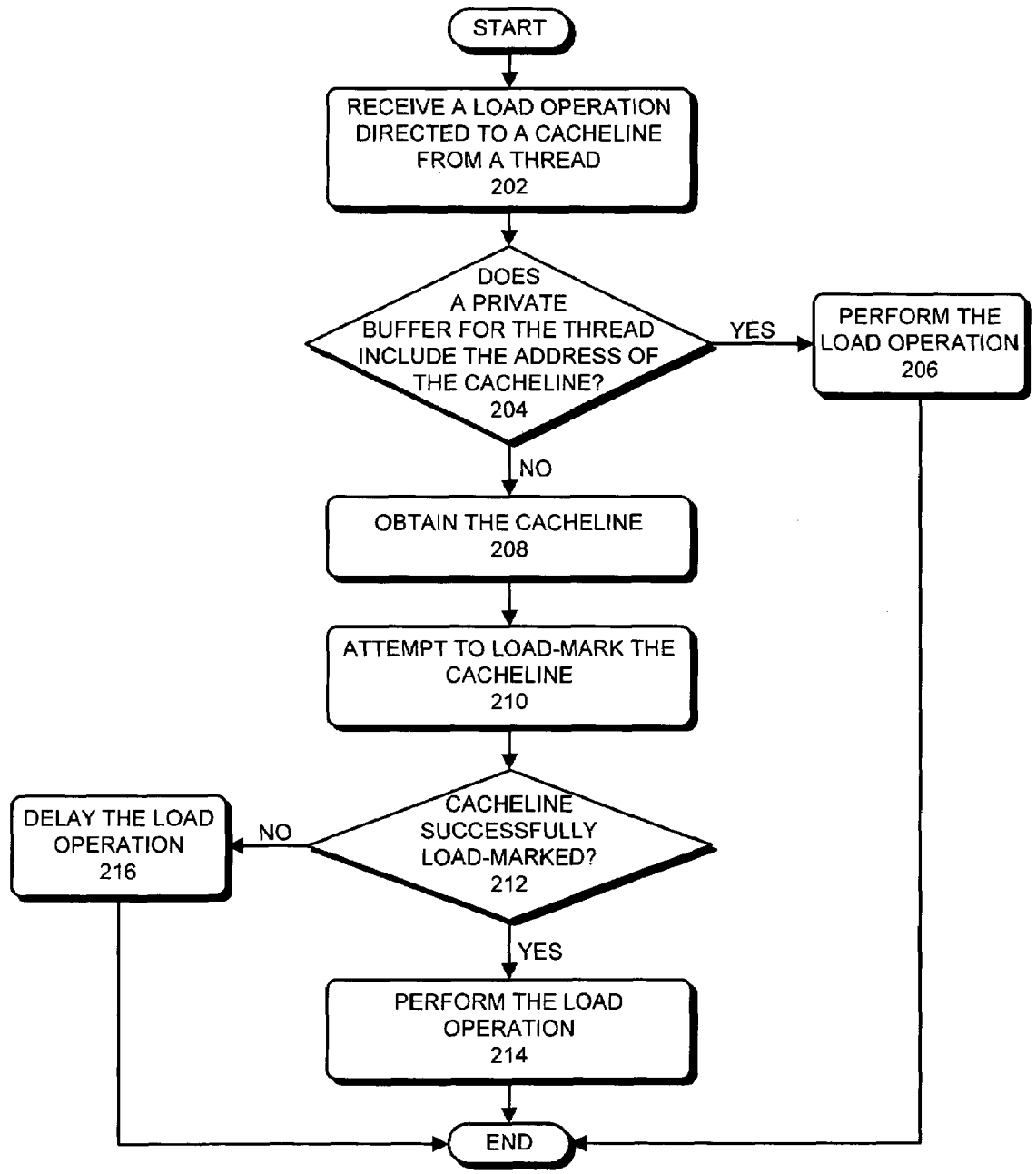
FIG. 2 presents a flowchart illustrating the process of performing a load operation in accordance with an embodiment of the present invention.

FIG. 2 presents a flowchart illustrating the process of performing a load operation in accordance with an embodiment of the present invention. The process starts when the system receives a load operation from a thread, wherein the load operation is directed to a cache line (step 202).

Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation without changing the status of the load-mark in the cache line (step 206).

If the private buffer does not contain a corresponding address, the thread has not yet load-marked the cache line. In this case, the system then obtains the cache line (step 208) and attempts to load-mark the copy of the cache line in the local cache (step 210).

If load-marking was successful (step 212), the system performs the load operation (step 214). Otherwise, the load operation is retried after a delay (step 216).

Attempting to Load-Mark the Cache Line

Figure 3:
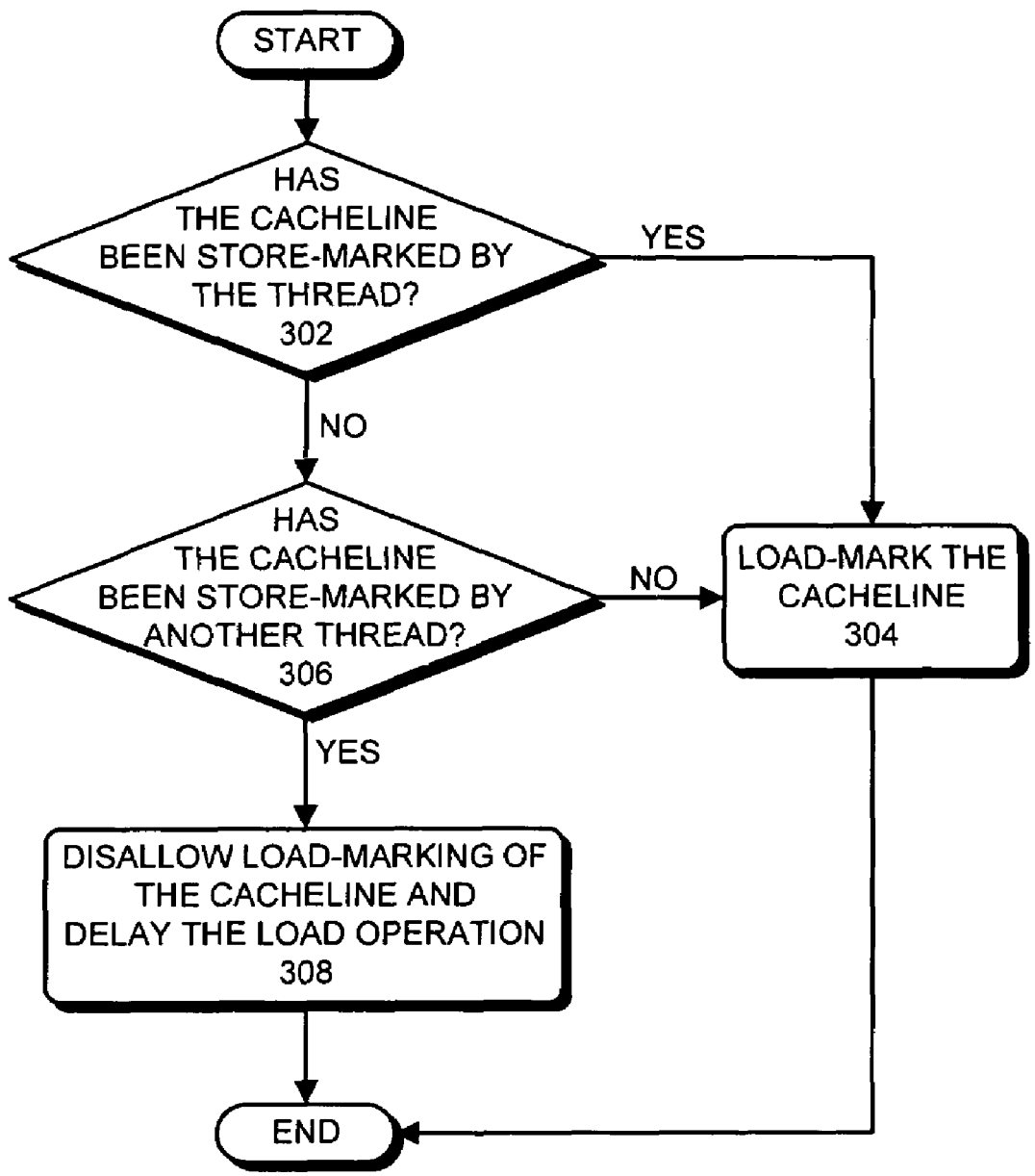
FIG. 3 presents a flowchart illustrating the process of attempting to load-mark a cache line in accordance with an embodiment of the present invention.

FIG. 3 presents a flowchart illustrating the process of attempting to load-mark the cache line in accordance with an embodiment of the present invention. During this process, a thread attempts to load-mark the cache line. The system first determines whether the cache line has been store-marked by the thread (step 302). Specifically, the system checks a store-mark buffer which maintains addresses of cache lines which have been store-marked by the thread to see if the address of the cache line exists in the store-mark buffer.

If the cache line has been store-marked by the thread, no other thread is allowed to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system proceeds to load-mark the cache line for the thread (step 304).

Figure 4:
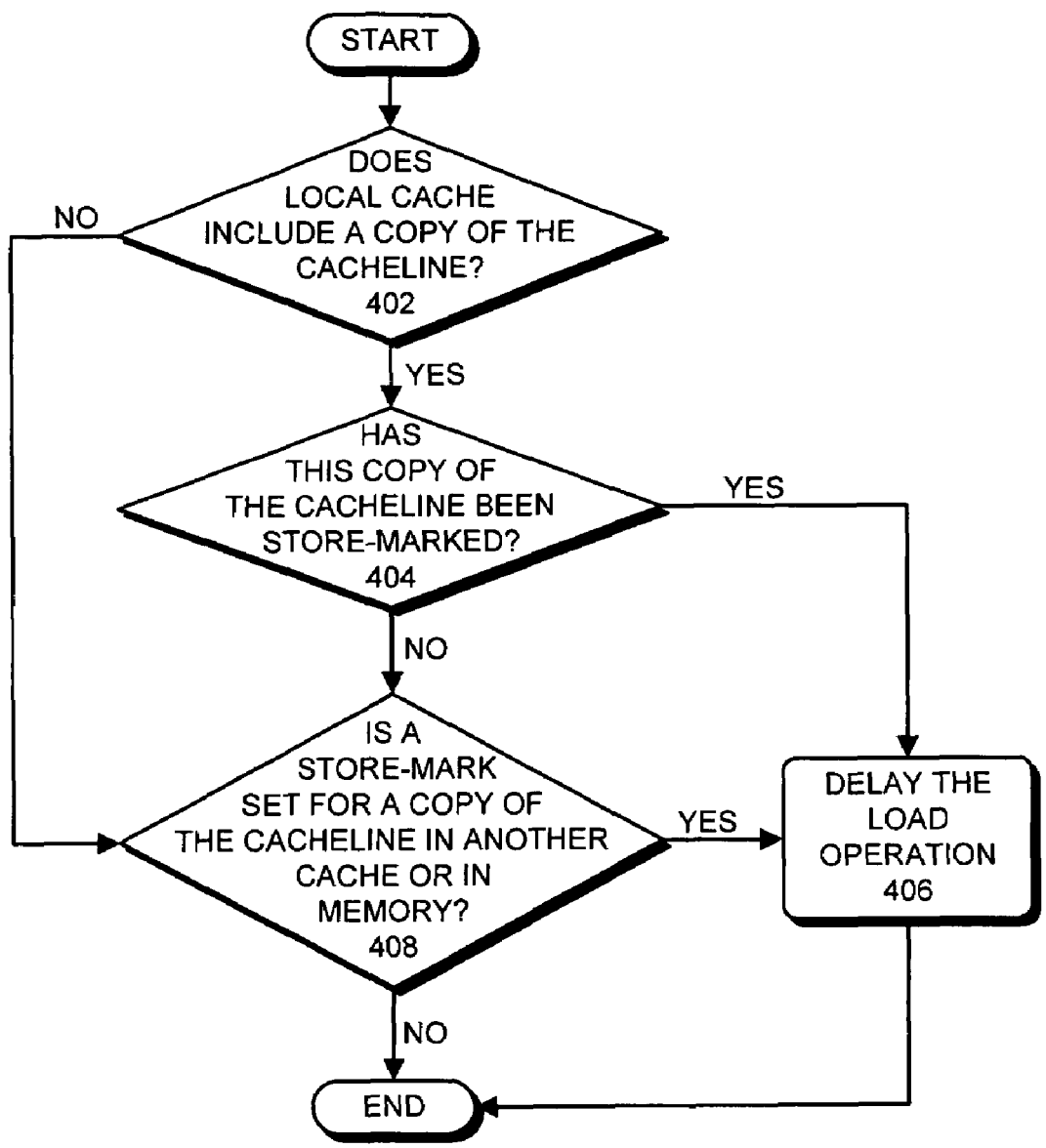
FIG. 4 presents a flowchart illustrating the process of determining whether the cache line has been store-marked by another thread in accordance with an embodiment of the present invention.

FIG. 4 presents a flowchart illustrating the process of determining whether the cache line has been store-marked by another thread in accordance with an embodiment of the present invention. During this process, the thread first checks in its local cache for a copy of the cache line (step 402). If the thread finds a copy of the cache line in its local cache, the thread examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in another cache or in memory (step 408). If so, the cache line has been store-marked by another thread, which means the cache line cannot be load-marked, and the load operation is delayed (step 406).

In one embodiment of the present invention, in step 408, the system uses a cache-coherence mechanism to determine whether another cache or the memory holds a store-marked copy of the cache line. This involves sending an exclusive access request for the cache line to the other caches. If the cache line has been store-marked in another cache, the system receives a NACK signal from the other cache which causes the request to fail, in which case the memory operation can be retried. If, however, the system does not receive a NACK signal and if there is no valid copy of the cache line in memory which contains a store-mark, the thread can conclude that the cache line has not been store-marked by another thread.

Note that although we have described using both load-marks and store-marks, load-marks can be used without also using store-marks.

Load-Marking a Cache Line

Figure 5:
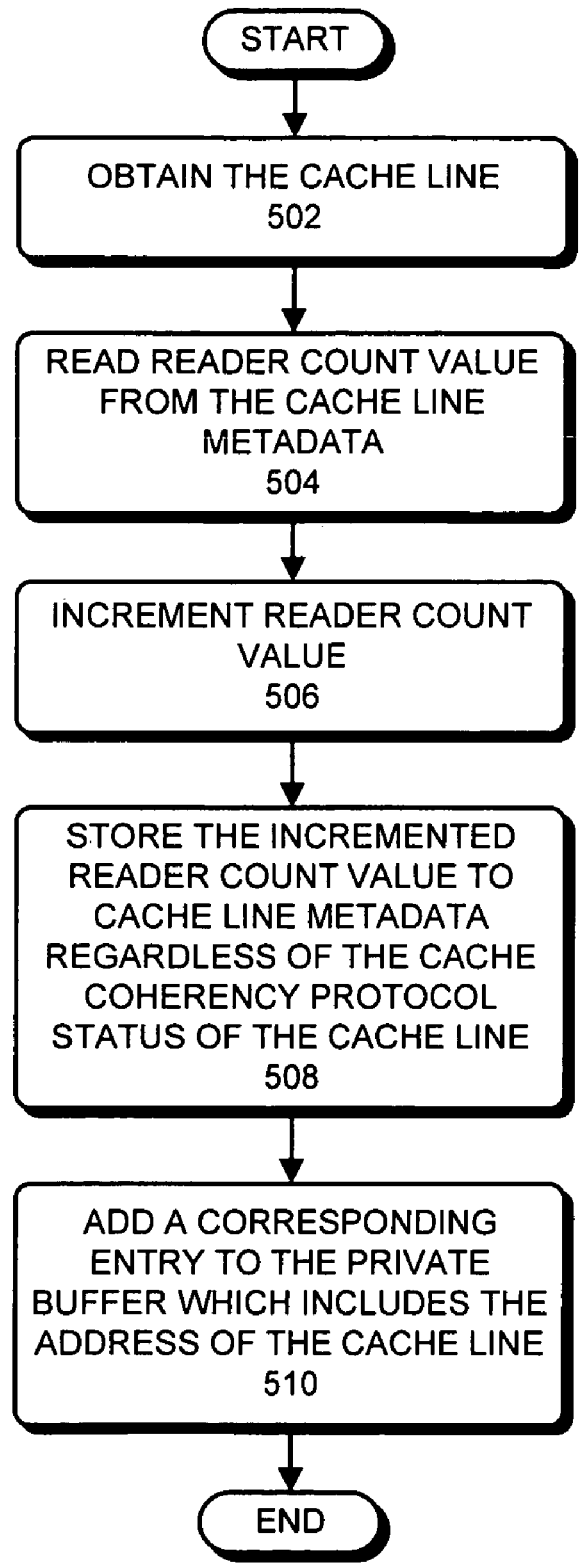
FIG. 5 presents a flowchart illustrating the process of load-marking a cache line in accordance with an embodiment of the present invention.

FIG. 5 presents a flowchart illustrating the process of load-marking a cache line in accordance with an embodiment of the present invention.

The system first obtains the cache line (step 502). Next, the system reads the reader count value from the cache line's load-mark metadata (step 504). The system then increments the reader count value (step 506), and subsequently stores the incremented reader count value back to the load-mark metadata for the cache line regardless of the valid cache coherency protocol state of the cache line (step 508). In other words, the system writes the load-mark metadata to the local copy of the cache line without obtaining write access to the cache line. For example, the system can update the load-mark metadata for a cache line when the cache line is in the shared (S) state without first placing the cache line in the modified (M) state. Finally, the system adds a corresponding entry to the private buffer for the thread which includes the address of the cache line (step 510).

When a thread subsequently either commits or fails (i.e., the thread determines that it will never commit) a set of loads that are directed to a cache line which was load-marked by the thread, the system removes the thread's load-mark from the cache line by decrementing the reader count value in the metadata for the cache line. (Note that the reader count value is decremented regardless of the valid cache coherency protocol status of the cache line.) In addition to decrementing the load-mark metadata, the thread removes the address of the cache line from the thread's private buffer.

Propagating Load-Marks

Because the load-mark metadata can be written to a cache line without first obtaining write access to the cache line, the system may have copies of a given cache line in a number of local caches with different load-mark metadata values. In one embodiment of the present invention, the system eventually propagates the updated load-mark metadata to the other caches and to memory. The following sections explain the process of propagating the load-mark metadata.

Note that obtaining a copy of the cache line in the proper coherency protocol state (as detailed in the following sections) is just the first step in reading or a writing a cache line. After the cache line has been obtained in the proper coherency protocol state, the thread has to verify that the desired access can be performed and, if necessary, add a load-mark or a store-mark before performing a read or write the cache line.

Figure 6A:
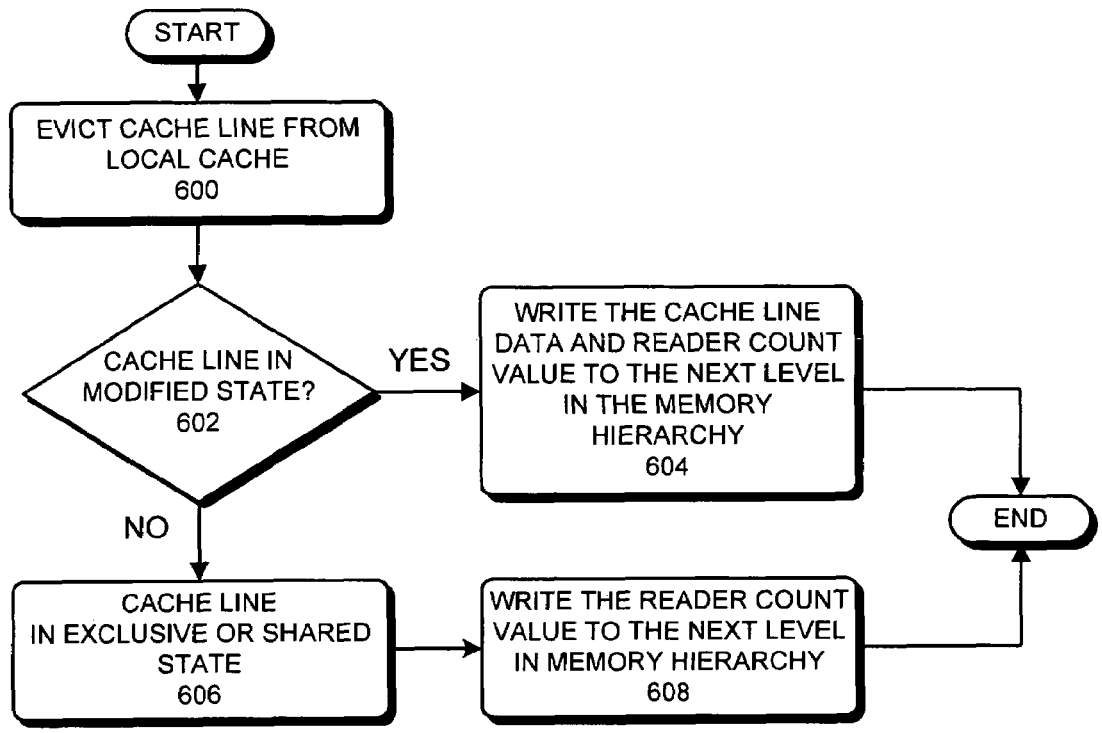
FIG. 6A presents a flowchart illustrating the process of propagating load-mark metadata for an evicted cache line in accordance with an embodiment of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and load-mark metadata to the next level of the memory hierarchy (step 604).

On the other-hand, if the cache line is not in the modified state, but is in the exclusive state or shared state (step 606), the system does not propagate the data in the cache line, but still writes the value of the load-mark metadata to the next level of the memory hierarchy where the load-mark metadata is added to the load-mark metadata for the instance of the cache line at that level of the hierarchy (step 608).

Figure 6B:
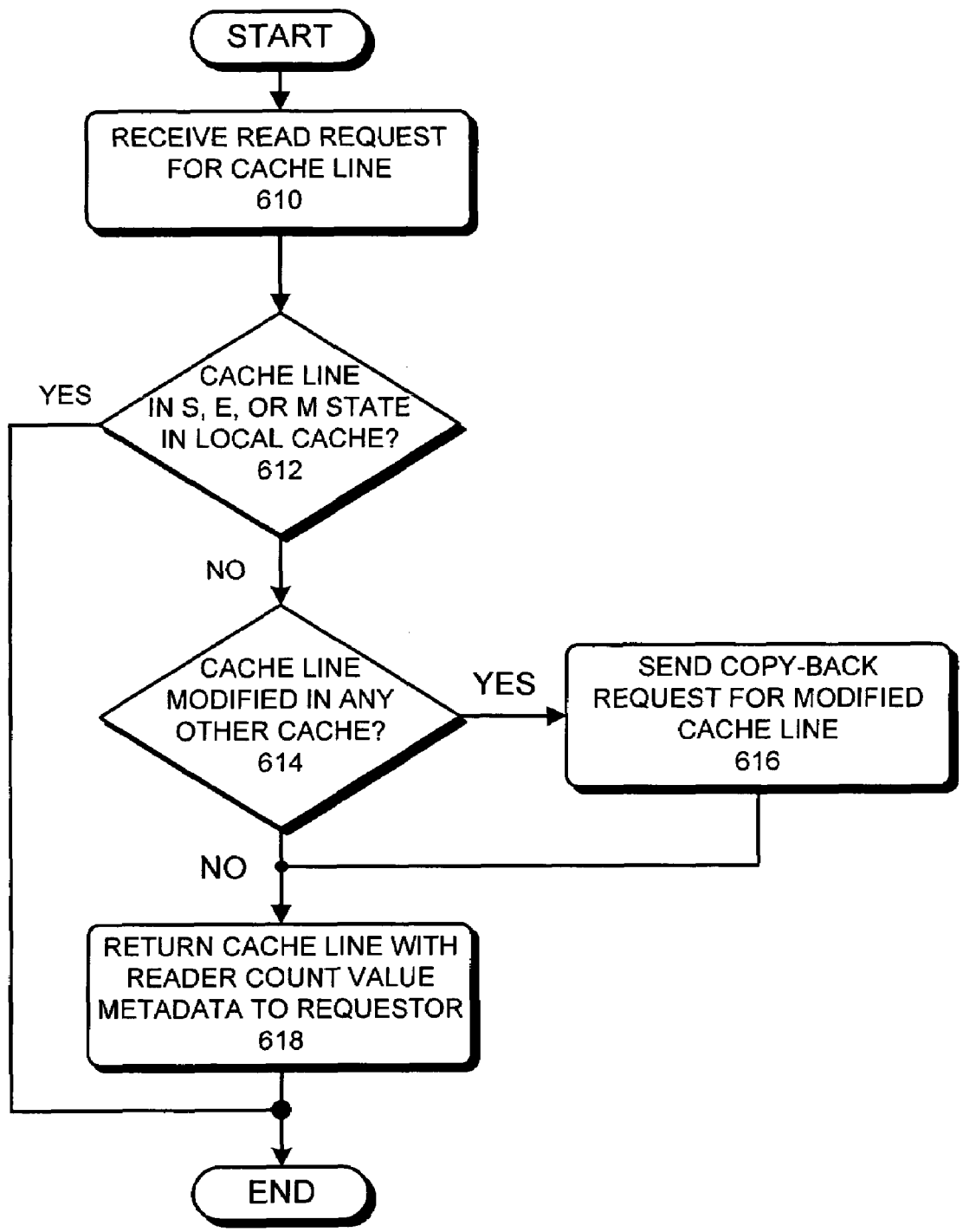
FIG. 6B presents a flowchart illustrating the process of propagating load-mark metadata for a cache line during a read operation in accordance with an embodiment of the present invention.

We next consider the case where the cache line is subject to a read operation as illustrated in FIG. 6B. The process starts when the system receives a read request for a cache line (step 610). The system first determines if the cache line is held the shared, exclusive, or modified state the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the load-mark metadata, which are returned to the requestor (step

618). Note that when responding to the copyback coherence request, the processor that holds the modified copy responds with a copy of the cache line, but also retains a local copy of the cache line in the shared state.

When the processor sends the load-mark metadata in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
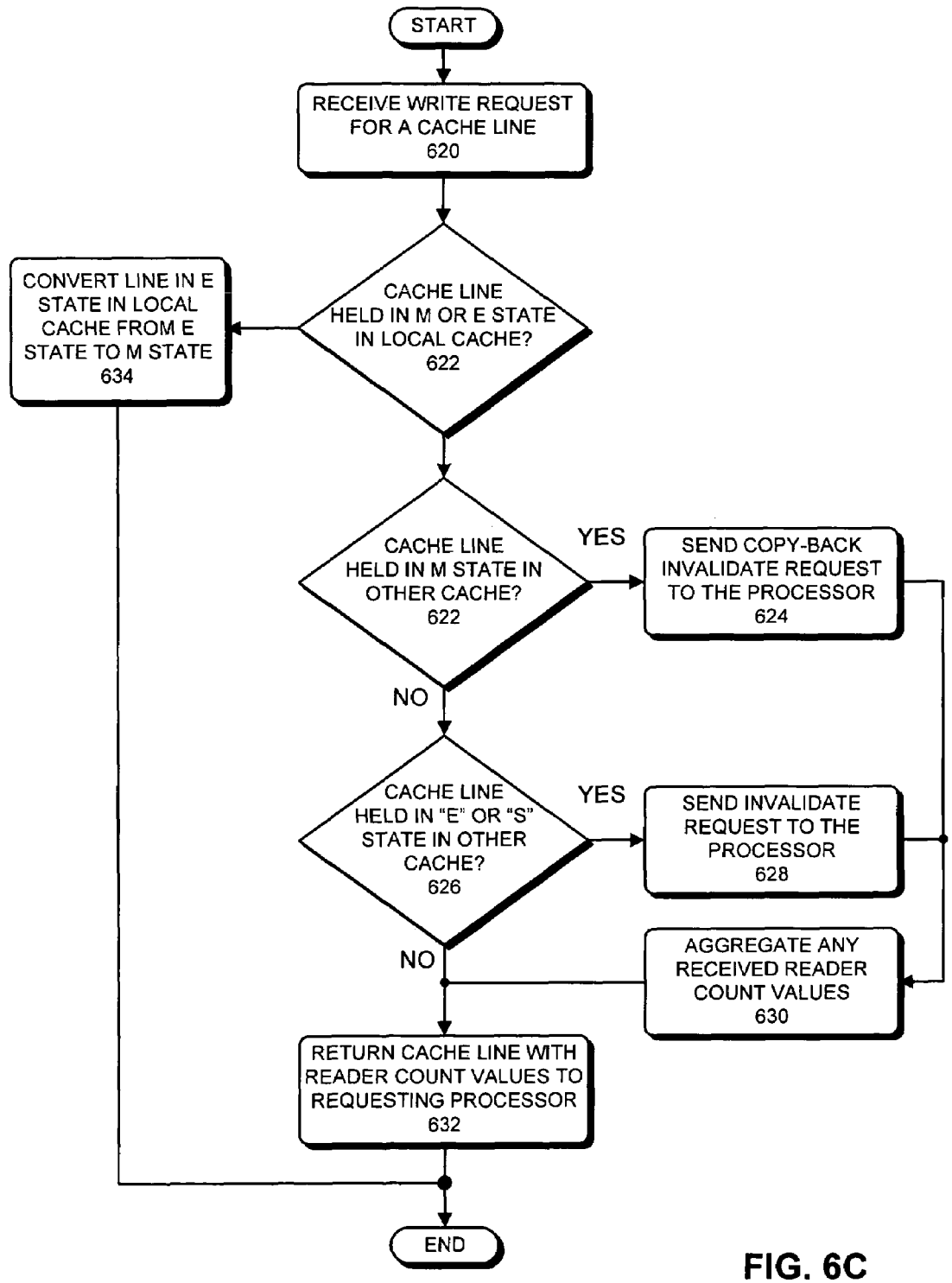
FIG. 6C presents a flowchart illustrating the process of propagating load-mark metadata for a cache line during a write operation in accordance with an embodiment of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state. If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for one embodiment of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and load-mark metadata are propagated back to memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in-the coherence domain that may contain a valid copy of the cache line (step 628). Upon receiving the invalidate coherence request at a given cache that holds the copy of the cache line, the load-mark metadata is propagated back to memory and the local copy of the cache line in the given cache is invalidated.

In addition, the system determines the number of load-marks that are on the copy of the cache line in memory. In one embodiment of the current invention, the system makes the determination by reading the metadata of the cache line in memory.

The system then sums load-mark metadata received from the other caches and from memory (step 630) and responds to the requester with a cache line, including the summed load-mark metadata (step 632). Hence, the copy of the line delivered to the requesting thread has a reader count value which is equal to the number of threads that have placed a load-mark on the line.

By propagating the load-mark metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

Alternative Embodiments

As described in the preceding sections, embodiments of the present invention send the metadata containing the reader count value via the memory system. In alternative embodiments, the processors in the CMP bypass the memory system when transferring the metadata. For example, one embodiment of the present invention uses a directory-based protocol in which the reader count value from metadata is sent directly to the requester rather than via memory. An alternative embodiment uses snooping protocols in which the load mark information is transferred via dedicated snoop lines or via packets to the requester.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for efficiently marking cache lines in a multi-processor computer system, comprising:
    a processor;
    a local cache coupled to the processor;
    a memory-control mechanism coupled to the local cache;
    a memory system coupled to the memory-control mechanism;
    wherein the memory-control mechanism is configured to receive a load request for a cache line from a requesting thread;
    upon receiving the request, the memory-control mechanism is configured to load a copy of the cache line from the local cache from the memory system; and
    wherein the memory-control mechanism is configured to load-mark the copy of the cache line in the local cache by incrementing a reader count value contained in metadata corresponding to the copy of the cache line regardless of the valid cache coherency protocol status of the copy of the cache line.

2. The apparatus of claim 1, wherein, upon receiving a write request for a cache line from a requesting thread, the memory system is configured to:
    aggregate reader count values from copies of the cache line held by other threads and in the memory system to produce an aggregated reader count value;
    copy the cache line and the aggregated reader count value to the local cache; and
    wherein the memory-control mechanism is configured to permit the requesting thread to write to the copy of the cache line in the local cache only if the aggregated reader count value indicates that no other threads have load-marked the cache line.

3. The apparatus of claim 1, wherein, upon receiving a read request for a cache line from a requesting thread wherein the cache line is in the modified state in a different processor's local cache, the memory system is configured to:
convert the cache line from the modified state to the shared state in the different processor's local cache; and to
deliver a copy of the cache line and metadata from the different processor's local cache to the local cache of the requesting thread.

4. The apparatus of claim 1, wherein upon evicting a cache line from the local cache, the memory-control mechanism is configured to:
write back the cache line and the reader count value to the memory system if the cache line is in the modified state; and
write back the reader count value to the memory system if the cache line is in the exclusive state or the shared state.

5. The apparatus of claim 1, wherein the memory-control mechanism is configured to not load-mark the cache line if the cache line has already been load-marked in the local cache.

6. The apparatus of claim 5, wherein after the thread has finished loading from a cache line, the memory-control mechanism removes the load-mark from the cache line by decrementing the reader count value in the metadata in the cache line, regardless of the valid cache coherency protocol status of the cache line.

7. A computer system for efficiently marking cache lines in a multi-processor computer system, comprising:
a processor;
a local cache coupled to the processor;
a memory-control mechanism coupled to the local cache;
a memory system coupled to the memory-control mechanism;
a mass-storage device coupled to the memory system, wherein the mass storage device is configured to store data and, program code;
wherein the memory-control mechanism is configured to receive a load request for a cache line from a requesting thread;
upon receiving the request, the memory-control mechanism is configured to load a copy of the cache line from the local cache from the memory system; and
wherein the memory-control mechanism is configured to load-mark the copy of the cache line in the local cache by incrementing a reader count value contained in metadata corresponding to the copy of the cache line regardless of the valid cache coherency protocol status of the copy of the cache line.

8. The computer system of claim 7, wherein, upon receiving a write request for a cache line from a requesting thread, the memory system is configured to:
aggregate reader count values from copies of the cache line held by other threads, in the memory system, and in the mass-storage device to produce an aggregated reader count value;
copy the cache line and the aggregated reader count value to the local cache; and
wherein the memory-control mechanism is configured to permit the requesting thread to write to the copy of the cache line in the local cache only if the aggregated reader count value indicates that no other threads have load-marked the cache line.

9. The computer system of claim 7, wherein, upon receiving a read request for a cache line from a requesting thread wherein the cache line is in the modified state in a different processor's local cache, the memory system is configured to:
convert the cache line from the modified state to the shared state in the different processor's local cache; and to
deliver a copy of the cache line and metadata from the different processor's local cache to the local cache of the requesting thread.

10. The computer system of claim 7, wherein upon evicting a cache line from the local cache, the memory-control mechanism is configured to:
write back the cache line and the reader count value to the memory system if the cache line is in the modified state; and
write back the reader count value to the memory system if the cache line is in the exclusive state or the shared state.

11. The computer system of claim 7, wherein the memory-control mechanism is configured to not load-mark the cache line if the cache line has already been load-marked in the local cache.

12. The computer system of claim 11, wherein after the thread has finished loading from a cache line, the memory-control mechanism removes the load-mark from the cache line by decrementing the reader count value in the metadata in the cache line, regardless of the valid cache coherency protocol status of the cache line.

13. A method for efficiently marking cache lines in a multi-processor computer system, comprising:
receiving a load request for a cache line from a requesting thread;
loading a copy of the cache line into a local cache for the requesting thread; and
load-marking the copy of the cache line in the local cache by incrementing a reader count value contained in metadata for the copy of the cache line regardless of the valid cache coherency protocol status of the copy of the cache line;
whereby the requesting thread can update the metadata in the copy of the cache line without having to obtain exclusive access to the cache line.

14. The method of claim 13, further comprising:
receiving a write request for a cache line from a requesting thread;
aggregating reader count values from copies of the cache line held by other threads and in a memory system to produce an aggregated reader count value;
providing the cache line and the aggregated reader count value to the requesting thread; and
wherein the requesting thread writes to the cache line only if the aggregated reader count value indicates that no other threads have load-marked the cache line.

15. The method of claim 13, further comprising:
receiving a read request for a cache line from a requesting thread, wherein the cache line is in the modified state in a different processor's local cache;
converting the cache line from the modified state to the shared state in the different processor's local cache; and
delivering a copy of the cache line and metadata from the different processor's local cache to the local cache of the requesting thread.

16. The method of claim 13, further comprising evicting the cache line from the local cache, wherein evicting the cache line involves:
sending the cache line and the reader count value to a memory system if the cache line is in the modified state; and
sending the reader count value to a memory system if the cache line is in the exclusive state or the shared state.

17. The method of claim 13, wherein the cache coherency protocol is a MESI protocol or a MOESI protocol.

18. The method of claim 13, wherein load-marking the cache line involves:
- reading the reader count value from metadata in the cache line;
- incrementing the reader count value; and
- writing the incremented reader count value back to the cache line.

19. The method of claim 13, wherein if the cache line has already been load-marked in the local cache, the cache line can be loaded without load-marking the cache line.

20. The method of claim 19, wherein after the thread has finished loading from a cache line, the method further comprises removing the load-mark from the cache line by decrementing the reader count value in the metadata in the cache line, regardless of the valid cache coherency protocol status of the cache line.

* * * * *